(12) United States Patent
Wang

(10) Patent No.: US 6,964,087 B1
(45) Date of Patent: Nov. 15, 2005

(54) METHOD FOR MANUFACTURING DIELECTRIC CERAMIC LAYER AND INTERNAL POLAR LAYER OF MULTIPLE LAYER CERAMIC CAPACITORS (MLCC) BY VACUUM SPUTTERING

(76) Inventor: Lei-Ya Wang, No. 5, Tung Yuang Road, Chung Li (TW)

( * ) Notice: Subject to any disclaimer, the term of this patent is extended or adjusted under 35 U.S.C. 154(b) by 0 days.

(21) Appl. No.: 10/853,272

(22) Filed: May 26, 2004

(30) Foreign Application Priority Data

May 12, 2004  (TW) ................. 93113284 A

(51) Int. Cl.⁷ .................. H01G 7/00; C23C 14/00
(52) U.S. Cl. .............. 29/25.41; 29/25.42; 29/846; 29/847; 29/DIG. 16; 427/523
(58) Field of Search .................. 29/25.41, 25.42, 29/846, 847, DIG. 16; 427/523, 524, 527, 427/29, 30, 31; 204/192.3, 192.22, 192.17; 216/100, 75

(56) References Cited

U.S. PATENT DOCUMENTS

| | | | |
|---|---|---|---|
| 4,439,813 A | * | 3/1984 | Dougherty et al. ...... 361/321.3 |
| 4,536,259 A | * | 8/1985 | Oda et al. ................... 205/238 |
| 4,604,676 A | * | 8/1986 | Senda et al. ................ 361/309 |
| 4,720,766 A | * | 1/1988 | Honda ..................... 361/275.3 |
| 5,021,921 A | * | 6/1991 | Sano et al. ............. 361/321.3 |
| 6,043,973 A | * | 3/2000 | Nagashima et al. ........ 361/305 |

* cited by examiner

Primary Examiner—A. Dexter Tugbang
Assistant Examiner—Tai Van Nguyen
(74) Attorney, Agent, or Firm—Troxell Law Office, PLLC

(57) ABSTRACT

A method for manufacturing the dielectric ceramic layer and the internal polar layer of the multiple layer ceramic capacitor by the vacuum sputtering process in which the dielectric ceramic layer and the internal polar layer of the MLCC has a finest thinness of 1~5 μm for the dielectric ceramic layer and 0.1~0.5 μm for the internal polar layer. Comparing the size and the voltage resistance with the MLCC formed by the traditional dot blade method—both the dry process and the wet process, the MLCC produced by the vacuum sputtering process is finer and thinner; comparing the layer number and the capacitance with the MLCC formed by the tradition dot blade method, the MLCC produced by the vacuum sputtering process has greater layer number and larger capacitance in the same size. When comparing with the layer number and the capacitance, the MLCC formed by the vacuum sputtering process has lesser layers.

1 Claim, 1 Drawing Sheet

METHOD FOR MANUFACTURING DIELECTRIC CERAMIC LAYER AND INTERNAL POLAR LAYER OF MULTIPLE LAYER CERAMIC CAPACITORS (MLCC) BY VACUUM SPUTTERING

FIELD OF THE INVENTION

This invention relates a new method for manufacturing the MLCC, in particular the vacuum sputtering process to produce the dielectric ceramic layer and the internal polar layer for the MLCC in an attempt to reduce the thickness of the internal polar layer and improve the fineness.

DESCRIPTION OF THE RELATED ART

The MLCC is one of the vital electronic components, to belittle the size or volume of MLCC, the laminating circuit process is adopted in which the dot blade method—both dry process and wet process is employed to produce the dielectric ceramic layer and the web printing process is operated to make the internal polar layer with a thickness between 1 $\mu$m~2 $\mu$m because the web printing is restrained by the web line diameter and the thickness of the sealed latex. The granule diameter of the conductive metal powder ranges from 0.3 $\mu$m to 1 $\mu$m, when mixed with resin to become sticking, due to the granule size, the thinnest internal polar layer the web printing can produce is 1 $\mu$m, the minimum.

The tread in the designing and developing the MLCC is heading to compact and minimization so the thickness of the internal polar layer shall be not in excess of 1 $\mu$m. Furthermore, the internal polar layer produced by means of the web printing process is too thick, not fine enough, the worst is that it has porous surface which would bring forth great affection on the working voltage and capacitance. The internal polar formed by the web printing process for the MLCC longer fits the development trend.

For the production cost of the MLCC, the dearest material is the internal polar layer which is made from the conductive precious metals such as palladium silver alloy, copper, nickel . . . etc. If the required capacitance is maintained steadfast, the thinner the internal polar layer, the more money is saved in the dear material, and the sharper the market competition will be. This is the bottleneck the industry is eager to break through.

SUMMARY OF THE INVENTION

With a strong desire to minimize the MLCC but maintain the large capacity, the inventor has designed a new method for manufacturing the dielectric ceramic layer and the internal polar layer of the MLCC by the vacuum sputtering process in which the dielectric ceramic layer and the internal polar layer fabricated and hence treated with nano technique will have a fine density with the thickness of 1~5 $\mu$m for the dielectric ceramic layer and 0.1~0.5 $\mu$m for the internal polar layer. The dielectric ceramic layer is really thin and fine. Comparing with MLCC in similar size and capacitance produced by the dot blade method—both the dry process and the wet process, the MLCC produced by the vacuum sputtering method has more layers and greater capacity than that produced by the dot blade method. For the same grade of capacitance and working voltage, the MLCC produced by the vacuum sputtering method requires lesser layers, lesser layers mean less production cost. Comparing the thickness of the internal polar layer against the MLCC produced by the dot blade method including the dry process and the wet process, the internal polar layer of the MLCC produced from the vacuum sputtering method is thinner and finer, resulting great cost reduction in material. And the overall size is belittled. So the MLCC provided by this invention is good for use in mini electronic products, such as cell phone set, digital camera, notebook computer . . . etc.

DETAILED DESCRIPTION OF THE INVENTION

Figure 1:
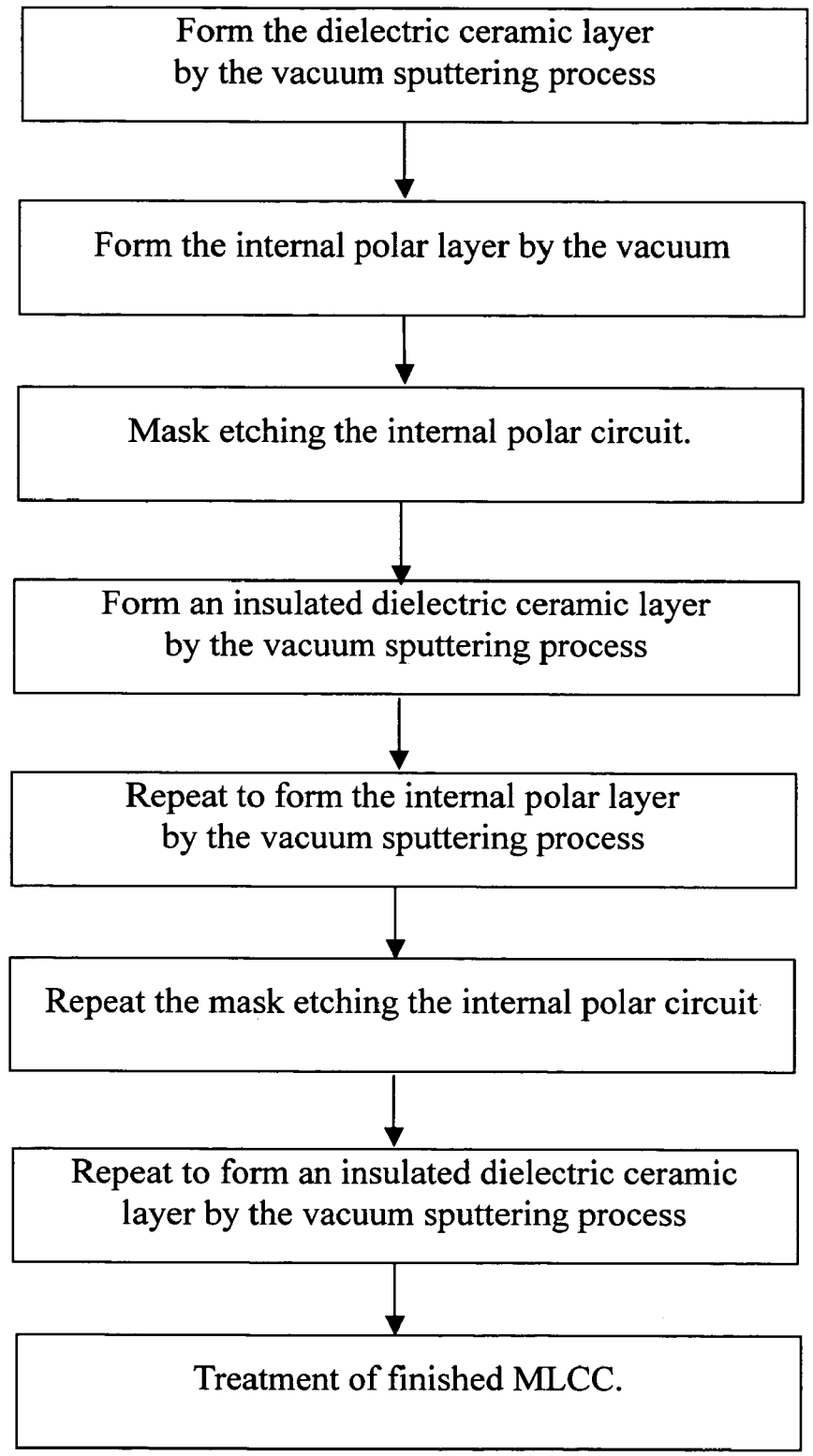
FIG. 1 shows manufacturing step to fabricate the dielectric ceramic layer and the internal polar layer for the MLCC in the vacuum sputtering process.

FIG. 1 shows the steps how to fabricate the dielectric ceramic layer of the internal polar layer of the MLCC.

Step 1: Fabricating the dielectric ceramic layer by the vacuum sputtering process, set the vacuum chamber at $5\times10^{-6}$ Torr, inject the Argon flow at 12 sccm and heat at 150° C. for 30 minutes till the sputtering bombardment begins, Hence reduce the chamber pressure to $3.1\times10^{-3}$ Torr, coating speed at 55 A/min, the sputtered dielectric ceramic atom will be evaporated to become a spasm to be attached and adsorbed on the substrate forming a film of 1~5 $\mu$m thick, a very fine dielectric ceramic layer.

Step 2: Fabricating the internal polar layer by the vacuum sputtering process, set the vacuum chamber at $5\times10^{-6}$ Torr, inject the Argon flow at 12 sccm and heat at 150° C. for 30 minutes till the sputtering bombardment begins, Hence reduce the chamber pressure to $3.1\times10^{-3}$ Torr, coating speed at 115 A/min, the sputtered metal atom will be evaporated to become a spasm to be attached and adsorbed on the substrate forming a film of 0.1~0.5 $\mu$m thick, a very fine internal polar layer.

Step 3: Apply mask etching treatment to draw the internal polar circuit on the internal polar layer, use the micro image photoresistor to expose the polar circuit track and employ etching process to finish the required internal polar circuit.

Step 4: To insulate the internal polar layer with another dielectric ceramic layer by setting the vacuum chamber at $5\times10^{-6}$ Torr, injecting the Argon flow at 12 sccm and heating at 150° C. for 30 minutes till the sputtering bombardment begins, Hence reduce the chamber pressure to $3.1\times10^{-3}$ Torr, coating speed at 55 A/min, the sputtered dielectric ceramic atom will be evaporated to become a spasm to be attached and adsorbed on the substrate forming a film of 1~5 $\mu$m thick, another very fine dielectric ceramic layer as does in the step 1.

Step 5: Repeat the Step 2 to form another internal polar layer by setting the vacuum chamber at $5\times10^{-6}$ Torr, injecting the Argon flow at 12 sccm and heating at 150° C. for 30 minutes till the sputtering bombardment begins, Hence reduce the chamber pressure to $3.1\times10^{-3}$ Torr, coating speed at 115 A/min, the sputtered metal atom will be evaporated to become a spasm to be attached and adsorbed on the substrate forming a film of 0.1~0.5 $\mu$m thick, another very fine internal polar layer.

Step 6: Repeat to etch the internal polar circuit by applying mask etching treatment to draw the internal polar circuit on the internal polar layer, using the micro image photoresistor to expose the polar circuit track and employ etching process to finish the required internal polar circuit.

Step 7: Repeat to insulate the with the dielectric ceramic layer by setting the vacuum chamber at $5\times10^{-6}$ Torr, injecting the Argon flow at 12 sccm and heating at 150° C. for 30 minutes till the sputtering bombardment begins, Hence reduce the chamber pressure to $3.1 \times 10^{-3}$ Torr, coating speed at 55 A/min, the sputtered dielectric ceramic atom will be evaporated to become a spasm to be attached and adsorbed on the substrate forming a film of 1~5 μm thick, another very fine dielectric ceramic layer as does in the step 4.

Step 8: Final treatment including cutting, drying, silver sealing end and performance test. This is the end of production of MLCC.

It is well learned the fact that from the step 4 on, the step 4 through step 7 are the repetition to produce another single film of the internal polar layer. Such repetition from step 5 through step 7 will produce many layers as desired and the step 8 is to make the layer a finished MLCC.

The special features of this vacuum sputtering method to produce the dielectric ceramic layer and the internal polar layer for the MLCC provided in this invention are described below:

1. The dielectric ceramic layer produced by the sputtering process is a dense and fine film at 1~5 μm. The thickness of the layer varies dependent on the working voltage and intended applications. It has transmuted from the micrometer or sub-micrometer treatment to nano treatment. Comparing with the MLCC produced by the dot blade method including dry process and wet process, the MLCC produced by the method of this invention has 50~100% more layers, it signifies that the thickness of the layer is halved or the capacitance is 100~200% doubled. Comparing the same capacitance and working voltage, the number of layer is 25~50% less. The MLCC provided in this invention can increase the voltage 50~100% or alternatively reduce the thickness 25~50% which is just the mini product the market requires.

2. The internal polar layer of the MLCC is fabricated by means of vacuum sputtering method, the layer is dense and fine in the thickness of 0.1~0.5 μm, and the thickness can vary based on the effective series resistance (ESR). The process has advanced from the micrometer or sub-micro treatment to the nano treatment. Comparing with the internal polar layer, the thickness is 30~80% less, that means great saving is realized in the precious conductive metal such as palladium silver alloy, copper, nickel . . . etc. and the size is minimized. Mini size and large capacitance is what the market asks for.

3. The vacuum sputtering chamber is used to produce both the dielectric ceramic layer and the internal polar layer. As the productive quantity requires, many vacuum sputtering chambers are arranged on the production and each single chamber is assigned with a single mission. When step 1 is finished in the chamber 1, the semi-finished is conveyed to the chamber 2 for the step 2 process and so on. This production layout would gain in time, labor and money.

Viewing from the above statement, it is apparent that the dielectric ceramic layer and the internal polar layer for the MLCC produced by this vacuum sputtering method is treated with nano treatment with a dense and fine film where the dielectric ceramic layer is 1~5 μm thick and the internal polar layer is 0.1~0.5 μm thick, just fitting mini MLCC requirement.

What is claimed is:

1. A method for manufacturing a dielectric ceramic layer and an internal polar layer for an MLCC and the manufacturing steps are as follows:

a) forming a first dielectric ceramic layer by initially setting a vacuum chamber pressure at $5 \times 10^{-6}$ Torr, injecting an Argon flow at 12 sccm and heating at 150° C. for 30 minutes until a sputtering bombardment begins thereby reducing the vacuum chamber pressure to $3.1 \times 10^{-3}$ Torr, coating speed at 55 A/min, the sputtered dielectric ceramic atom will be evaporated to become a spasm to be attached and adsorbed on a substrate forming a film of 1~5 μm thick;

b) forming a first internal polar layer by setting the vacuum chamber pressure at $5 \times 10^{-6}$ Torr, injecting the Argon flow at 12 sccm and heating at 150° C. for 30 minutes until the sputtering bombardment begins thereby reducing the vacuum chamber pressure to $3.1 \times 10^{-3}$ Torr, coating speed at 115 A/min, the sputtered metal atom will be evaporated to become a spasm to be attached and adsorbed on the substrate forming a film of 0.1~0.5 μm thick;

c) applying a mask etching treatment to draw a first internal polar circuit on the first internal polar layer, exposing a first polar circuit track using a micro image photoresistor and employing an etching process to finish the first internal polar circuit;

d) forming a first insulation dielectric ceramic layer on the first internal polar layer by setting the vacuum chamber pressure at $5 \times 10^{-6}$ Torr, injecting the Argon flow at 12 sccm and heating at 150° C. for 30 minutes until the sputtering bombardment begins thereby reducing the vacuum chamber pressure to $3.1 \times 10^{-3}$ Torr, coating speed at 55 A/min, the sputtered dielectric ceramic atom will be evaporated to become a spasm to be attached and adsorbed on the internal polar layer to form the first insulated dielectric ceramic layer, finishing a single capacitor;

e) forming a second internal polar layer by setting the vacuum chamber pressure at $5 \times 10^{-6}$ Torr, injecting the Argon flow at 12 sccm and heating at 150° C. for 30 minutes until the sputtering bombardment begins thereby reducing the vacuum chamber pressure to $3.1 \times 10^{-3}$ Torr, coating speed at 115 A/min, the sputtered precious metal atom will be evaporated to become a spasm to be attached and adsorbed on the dielectric ceramic layer forming a film of 1~5 μm thick;

f) applying the mask etching treatment to draw a second internal polar circuit on the second internal polar layer, exposing a second polar circuit track using the micro image photoresistor and employing the etching process to finish the second internal polar circuit;

g) forming a second insulation dielectric ceramic layer on the second internal polar layer by setting the vacuum chamber pressure at $5 \times 10^{-6}$ Torr, injecting the Argon flow at 12 sccm and heating at 150° C. for 30 minutes until the sputtering bombardment begins thereby reducing the vacuum chamber pressure to $3.1 \times 10^{-3}$ Torr, coating speed at 55 A/min, the sputtered dielectric ceramic atom will be evaporated to become a spasm to be attached and adsorbed on the internal polar layer to form the second insulated dielectric ceramic layer; and h) finishing the MLCC by performing a final treatment including cutting, drying, silver sealing end and performance test.

* * * * *